DUAL HEAD MAGNETIC RECORDER

Filed May 29, 1953

INVENTOR.

Leonard D. Barry 2,885,489

DUAL HEAD MAGNETIC RECORDER

Leonard D. Barry, Detroit, Mich.

Application May 29, 1953, Serial No. 358,454
15 Claims. (Cl. 179—100.2)

This invention relates to a dual head magnetic recorder and method and in particular to a novel method and means for magnetically recording in which a longitudinal signal is applied adjacently, simultaneously, and with reverse polarity to both sides of a magnetic medium.

The maximum frequency recordable on a medium at a given speed for a given output level required is limited by the medium and the recording head. The voltage generated in playback is directly proportional to the thickness of the medium at low frequencies, other factors being equal; but the thickness of the medium is of little importance at the short wave lengths of relatively high frequencies for recording. This indicates, as is well known, that the flux of these relatively high frequencies has not penetrated very deeply. This phenomenon known as surface effect has limited the energy of the short recorded magnets, since they have not sufficient length to give a strong external flux. (Recorded longitudinal magnets represent a half cycle of the frequency being recorded and are therefore known as half-wave magnets.)

It is an object of this invention to provide a means to lengthen the internal flux paths of the high frequency half-wave magnets without increasing the speed of the medium with respect to the heads, and thereby increase the signal strength, reduce the tendency of self demagnetization of the recorded signal, and enable the recording medium to take a higher frequency at a lower speed for a given output level than was previously practiced.

A further object is to cause the flux to enter, leave, and penetrate to some extent the recording medium substantially vertically, providing optimum utility of the medium and reducing the importance of good contact between the recording medium and the head.

These foregoing objects are in general similar to certain objects of my pending application on Flux Diverter. These two inventions can be used together in cooperation on the same recording unit.

A further object is to provide for utilizing a steel or magnetic powder-impregnated tape having a shielding layer as disclosed in my Patent No. 2,714,133 on Magnetic Shielding Medium to provide a greater intensity and variation of recording per unit volume and surface area than practiced with other tapes or with these tapes with previous recording methods.

These and other objects and advantages of this invention should become apparent from the following disclosure and study of this invention.

The invention will be described in connection with the drawing wherein.

Figures 1, 2, 3, 4, 5:
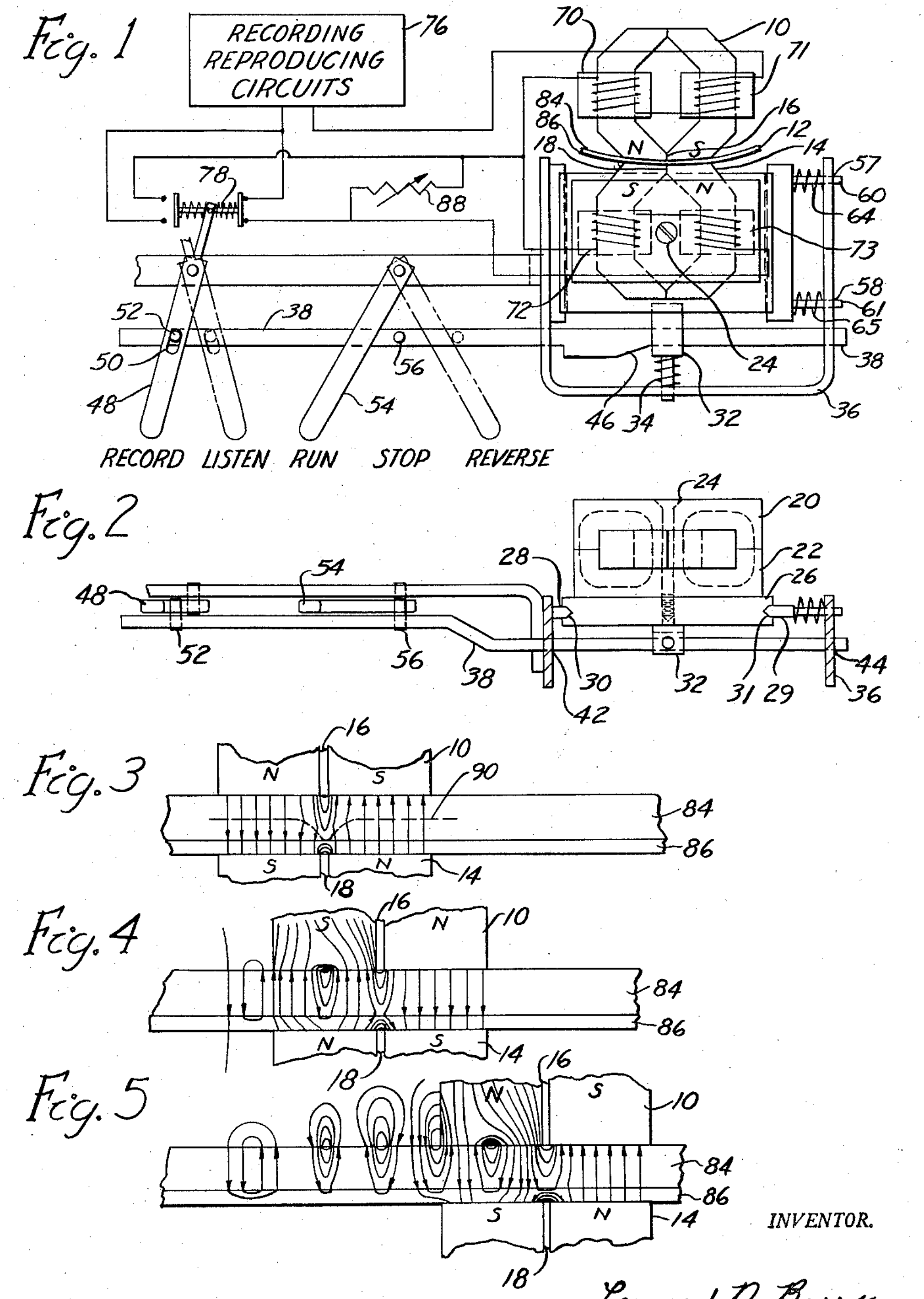
Figure 1 is a diagrammatic plan view of a portion of a magnetic recorder disclosing my invention.
Figure 2 is a side view of Figure 1.

Figures 3, 4, and 5 are a successive series of sectional diagrams of portions of the poles in contact with the tape with the recording and recorded flux represented as during a recording.

Referring to the drawing and in particular to Figures 1 and 2, magnetic ring-type recording head 10 contacting tape 12 has an auxiliary recording ring-type head 14 contacting the opposite side of tape 12 adjacent head 10. The recording gap pieces 16 and 18 of heads 10 and 14 respectively are aligned in the same plane. Head 14 is held by clamping pieces 20 and 22 and screw 24 to plate 26 which is movable on guides 28 and 29 which fit in grooves 30 and 31 on opposite edges of the plate and at right angles to a plane taken through the adjacent pole edges of either head. An extension 32 on plate 26 rearward of the face of head 14 is provided with a spring 34 bearing against the frame 36 of the recorder to force head 14 into contact with the tape 12. Control linkage bar 38 engages against an extension 32. Bar 38 is slidably mounted in the frame at 42 and 44. Bar 38 has an incline plane 46 engaging extension 32 so as to move head 14 away from engagement with tape 12 according to the axial position of the bar.

A Record-Listen lever 48 has a slot 50 which engages a pin 52 on bar 38 so as to disengage the head 14 from the tape when moved from Record to Listen and to engage the head when moved from Listen to Record. A Run-Stop-Reverse lever 54 engages pin 56 on bar 38 between positions Stop and Reverse so as to disengage head 14 from the tape when moved from Stop to Reverse. Bar 38 is shown in the position permitting head 14 to engage tape 12 with levers 48 and 54, which also perform their usual function, shown in positions Record and Run respectively. The lever positions are appropriately labeled in Figure 1.

Guide 29 is slidably held in holes 57 and 58 in frame 36 on parallel rods 60 and 61 and engages groove 31 on plate 26 under pressure from coil springs 64 and 65 around rods 60 and 61. This arrangement holds plate 26 firmly against guide 28, preventing chatter of head 14 against the tape.

Heads 10 and 14 are provided with the usual coils 70 and 71 and 72 and 73 respectively. Coils 70, 71, 72, and 73 are connected in series to the Recording-Reproducing circuits 76 by switch 78, which is actuated by lever 48 when closed to Record position. Coils 70 and 71 are connected to circuits 76, while coils 72 and 73 are disconnected by switch 78 when lever 48 is closed in Listen position. Coils 70, 71, 72, and 73 are so arranged as to provide alternate polarity during recording as indicated by north and south pole markings N and S reversely on opposite sides of tape 12.

The operation of this recorder is best explained by reference to Figures 3, 4, and 5. The gap pieces 16 and 18 on heads 10 and 14 respectively, while greatly enlarged, are approximately relative in size to the thickness of tape 12. This tape has preferably a dispersed magnetic power recording layer 84 and a magnetically soft highly permeable shielding layer 86 on the opposite side of layer 84 from the main head 10. The horizontal displacements of the heads from Figure 3, shown in Figures 4 and 5, represents the movement of the tape which is shown stationary. The strong flux impressed on the recording layer 84 retains its identity as the tape moves, and the changing flux in the heads takes preferred paths to opposite poles. The flux from the north pole of the recording-reproducing head 10 nearest its shim gap links to the adjacent pole thereof; while the flux farther from the gap instead of linking to the adjacent pole, which would crowd the recorded flux near the gap to the surface of the tape, prefers to cross the tape to the opposite pole on the auxiliary head 14. The adjacent pole on the auxiliary head then sends flux to the opposite pole on the main head completing an interhead flux linkage. The auxiliary head also has flux linking between its adjacent poles but in the opposite direction from that across the main head gap. This opposing flux is preferably limited to the magnetically soft layer, which has a higher permeability than the recording medium. Variable resistance 88, shown in Figure 1, is optionally included to regulate the flux provided by the auxiliary head 14 to adjust the ratio of flux between adjacent poles of the auxiliary head and between adjacent poles of the main head to an optimum value. The flux lines passing through the tape approach close to the gap and the cramp the flux between adjacent poles of the main head into hairpin like recorded magnets as shown. This is ideal for high frequencies and irregular magnetic surges.

Because the tape is magnetically shielded, the auxiliary head is not useful in playback, further the impedance that this head would add offsets any small gain, also by disconnecting the auxiliary head in playback gap alignment and constancy become much less critical, and with the system shown nearly all the recorded flux reaches the main head in playback. If a non-shielded tape were used the auxiliary head would find utility in playback, but adjacent layers of the tape would tend to show magnetic printing.

With perpendicular recording the flux recorded is proportional to the recording current. With longitudinal recording the flux is proportional to the rate of change of the recording current. In either case the pickup voltage is proportional to the rate of change of flux. Therefore perpendicularly recorded components can be picked up longitudinally without distortion resulting from a different mode of pickup; also perpendicular recording of long waves made with opposite poles in which the recording of one pole would be counteracted by the next in part or whole is done so in such a way as to provide in effect a longitudinal recording.

For best results the recording layer 84 and the flux return and shielding layer 86 should be proportioned in thickness and permeability so as to bring the zone of neutral polarity (which is represented by points of equal pull from opposite poles, and is shown as dashed line 90 in Figure 3) to or into the return layer 86 midway between the poles of the auxiliary head 14, thus achieving a pronounced hairpin curve of flux in the recording layer. The $B/H$ ratio of each of the two layers remains substantially linearly related over the working range, and line 90 remains stationary relative to the recording gap as long as the $B/H$ ratio of both layers remain linearly related.

Having thus described one embodiment of my invention, it is understood that many modifications will be apparent to those skilled in the art which are within the spirit and scope of this invention as claimed.

I claim:

1. In a magnetic recording device, a magnetic recording tape having a recording side and a back side, two ring-type electromagnetic heads placed against opposite sides of said tape, each said head having two adjacent poles separated by a magnetic gap, each pole of each said head facing the magnetically opposite pole of the other said head, the gaps separating said poles of the same head lying in substantially the same plane, coil means on said heads electrically connected so as to provide opposite polarity on both the adjacent and facing said poles, said tape being arranged to longitudinally pass between said heads, signal means connected to said coil means to record said tape with said head which is against the recording side of said tape and to increase the depth of tape recording with the other said head during the recording of short half-wave magnets.

2. In a magnetic recording device as claimed in claim 1 said tape being an impregnated tape which consists of in section one layer of dispersed magnetic oxide and a binder and one magnetic layer having high permeability and low coercivity joined to the first mentioned said layer.

3. In a magnetic recording device as claimed in claim 1 said tape being one thin layer of material having high coercivity and retentivity with one thin layer of material of low coercivity and high permeability applied to one side thereof.

4. In a magnetic recording device as claimed in claim 1, one of said heads having its pole faces curved convex in the direction of tape movement thereon, the other of said heads being curved concave to fit against the portion of the curve of the tape over the convex said head at its said gap.

5. A magnetic recorder which includes; two magnetic ring-type recording heads placed and electrically connected with each pole of each head superposed with the pole of opposite polarity on the other said head and with recording gaps substantially parallel and aligned, means providing substantially linear movement of said heads toward and away from each other, means forcing said heads toward each other, the heads being arranged so as to receive a magnetic medium between them.

6. In a magnetic recording-reproducing device, a dual pole recording head a dual pole auxiliary electromagnetic recording head, the poles of said heads having substantially matching boundary faces each aligned with and placed opposite the pole of opposite polarity on the opposite said head, gap pieces separating the poles along one boundary plane and an air gap separating the poles in the other boundary plane whereby a magnetic medium can be inserted through said air gap, a signal source connected to both said heads oppositely magnetizing facing aligned heads so as to deeply draw flux of short half-wave magnets being recorded in said medium.

7. In a magnetic recording device, two ring-type electromagnetic heads their poles facing and superposed with the pole of opposite polarity on the other said head and their gaps aligned in substantially the same plane, and means holding and providing relative movement of the heads perpendicular to their facing faces whereby the heads can be engaged against a recording medium therebetween for recording and held apart when desired.

8. In a magnetic recording-reproducing device, a magnetic tape, a main and an auxiliary ring-type electromagnetic head, said heads being placed with opposite poles facing each other and their gaps substantially aligned in the same plane, said main head being relatively fixed to the recording device, a movable mounting means, said auxiliary head fixed thereon, said mounting means being arranged so as to allow movement of said auxiliary head toward and from said main head, a Record-Listen switch, linkage means between said switch and said mounting means so as to urge said auxiliary head toward said main head for recording and move said auxiliary head away from said main head for reproducing, electrical switch means for connecting said heads in series for recording and separately connecting said main head for reproducing.

9. In a magnetic recording device as claimed in claim 8 said electrical switch means being actuated by said Record-Listen switch.

10. In a magnetic recording device as claimed in claim 8, adjustable electrical means for bypassing a portion of the total recording signal current away from said auxiliary head.

11. In a magnetic recording device as claimed in claim 8, Run-Stop-Reverse switch means, linkage means whereby said Record-Listen switch is moved from Record to Listen when the Run-Stop-Reverse switch means is moved from Stop to Reverse.

12. In a magnetic recording device as claimed in claim 8 said tape comprising a recording layer and a flux return layer of low coercivity and of higher permeability than said recording layer and on the opposite side of the tape from the main head, the thickness and relative permeability of the two said layers being proportioned so as to bring the zone of neutral polarity from approximately the middle of the recording layer in line with the center of the pole faces (and outward) into the surface of the return layer midway between the poles of said auxiliary head during recording.

13. In a magnetic recording-reproducing device, a first and second ring-type electromagnetic head each placed with opposite poles facing each other and their gaps substantially aligned in the same plane, said first head being relatively fixed to the recording device, a moveable mounting means, said second head being fixed thereon, a guideway slidably retaining said mounting means so as to allow movement of said second head toward and from said first head, a Record-Listen switch, linkage and mechanical means between said switch and said mounting means arranged so as to urge said second head toward said first head for recording and move said second head away from said first head for reproducing.

14. In the combination claimed in claim 13, said linkage and mechanical means comprising, a bar, a wedge thereon engaging with said mounting means, spring means urging said mounting means to carry said second head toward said first head, the position of said bar with wedge controlling the movement of said mounting means by said spring means.

15. In a combination as claimed in claim 13, said moveable mounting means having first groove means on each side thereof, said guideway comprising a second groove means held in fixed position with respect to the recording-reproducing device and a third groove means resiliently supported with respect to the recording-reproducing device so as to force said second and third groove means into engagement with said first groove means whereby said second head is held tightly from sidewise play and yet enabled movement to and from said first head.

References Cited in the file of this patent

UNITED STATES PATENTS

| | | |
|---|---|---|
| 2,436,829 | Roth | Mar. 2, 1948 |
| 2,484,568 | Howell | Oct. 11, 1949 |
| 2,496,047 | Goddard | Jan. 31, 1950 |
| 2,519,592 | Muller | Aug. 22, 1950 |